(12) United States Patent
Ahn

(10) Patent No.: US 11,132,148 B2
(45) Date of Patent: Sep. 28, 2021

(54) SEMICONDUCTOR MEMORY DEVICE AND A METHOD OF OPERATING THE SAME

(71) Applicant: SK hynix Inc., Icheon-si (KR)

(72) Inventor: Sung Ho Ahn, Suwon-si (KR)

(73) Assignee: SK hynix Inc., Icheon-si (KR)

( * ) Notice: Subject to any disclaimer, the term of this patent is extended or adjusted under 35 U.S.C. 154(b) by 43 days.

(21) Appl. No.: 16/725,510

(22) Filed: Dec. 23, 2019

(65) Prior Publication Data

US 2020/0363992 A1 Nov. 19, 2020

(30) Foreign Application Priority Data

May 13, 2019 (KR) .......................... 10-2019-0055761

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .............. G06F 3/0679; G06F 12/0246; G06F 2212/7202; G06F 3/0604; G06F 3/0611; G06F 3/0616; G06F 3/064; G06F 3/0659; G06F 3/0673; G06F 13/28; G06F 3/0619; G06F 11/0775; G06F 11/085; G06F 13/124; G06F 3/061; G06F 3/0635; G06F 3/0689; G06F 9/30032; G06F 9/30043; G06F 9/3861; G06F 12/0253; G11C 11/5628; G11C 16/0483; G11C 16/08; G11C 16/10; G11C 16/102; G11C 16/14; G11C 16/16; G11C 16/24; G11C 16/26; G11C 16/34; G11C 16/3459; G11C 29/74

USPC .......... 711/E12.007, E12.008, E12.061, 102, 711/103, 203, E12.04, 200, E12.001, 100, 711/112, 162

See application file for complete search history.

(56) References Cited

U.S. PATENT DOCUMENTS

2013/0103893 A1\* 4/2013 Lee .......................... G06F 3/064
711/103

FOREIGN PATENT DOCUMENTS

KR 1020120109841 A 10/2012
KR 1020170084409 A 7/2017

\* cited by examiner

*Primary Examiner* — Thong Q Le
(74) *Attorney, Agent, or Firm* — William Park & Associates Ltd.

(57) ABSTRACT

Provided herein is a semiconductor memory device including a memory cell array, a peripheral circuit, an operation information storage, and control logic. The memory cell array may include a plurality of memory cells. The peripheral circuit may perform a read operation for setup information stored in the memory cell array. The operation information storage may store the setup information. The control logic may control a read operation of the peripheral circuit and a storage operation of the operation information storage. The control logic may control the peripheral circuit and the operation information storage such that a storage section in which the operation information storage stores first setup information and a read section in which the peripheral circuit reads second setup information from the memory cell array are at least partially overlapped with each other.

16 Claims, 15 Drawing Sheets

SEMICONDUCTOR MEMORY DEVICE AND A METHOD OF OPERATING THE SAME

CROSS-REFERENCE TO RELATED APPLICATION

The present application claims priority under 35 U.S.C. § 119(a) to Korean patent application number 10-2019-0055761, filed on May 13, 2019, the entire disclosure of which is incorporated herein by reference in its entirety.

BACKGROUND

1. Technical Field

Various embodiments of the present disclosure generally relate to an electronic device, and more particularly, to a semiconductor memory device and a method of operating the semiconductor memory device.

2. Related Art

Generally, a memory device may have a two-dimensional structure in which memory strings are horizontally arranged on a semiconductor substrate or a three-dimensional structure in which memory strings are vertically stacked on a semiconductor substrate. The three-dimensional memory device may be a device which is devised to overcome a limitation in the degree of integration of the two-dimensional memory device and may include a plurality of memory cells which are vertically stacked on a semiconductor substrate.

SUMMARY

Various embodiments of the present disclosure are directed to a semiconductor memory device having an improved operating speed.

Various embodiments of the present disclosure are directed to a method of operating a semiconductor memory device having an improved operating speed.

An embodiment of the present disclosure may provide a semiconductor memory device including a memory cell array, a peripheral circuit, an operation information storage, and control logic. The memory cell array may include a plurality of memory cells. The peripheral circuit may perform a read operation for setup information stored in the memory cell array. The operation information storage may store the setup information. The control logic may control the read operation performed by the peripheral circuit and a storage operation of the operation information storage. The control logic may control the peripheral circuit and the operation information storage such that a storage section in which the operation information storage stores first setup information and a read section in which the peripheral circuit reads second setup information from the memory cell array are at least partially overlapped with each other.

The memory cell array may include a user area and a reserved area. In this case, the setup information may be stored in the reserved area.

The setup information may be stored in the operation information storage during an initialization operation.

The plurality of memory cells may include nonvolatile memory cells, and the operation information storage may include a volatile memory.

The control logic may control the operation information storage and the peripheral circuit such that the peripheral circuit starts the read operation for reading the second setup information after a predetermined waiting period has passed from a time when the operation information storage starts storing the first setup information.

After option information about the read operation among the setup information is stored in the operation information storage, the storage operation and the read operation may be performed such that the storage section for storing the first setup information and the read section for reading the second setup information are at least partially overlapped with each other.

An embodiment of the present disclosure may provide a semiconductor memory device including a memory cell array, a peripheral circuit, an operation information storage, and control logic. The memory cell array may include a plurality of memory cells. The peripheral circuit may perform a read operation for setup information stored in the memory cell array. The operation information storage may store the setup information. The control logic may control the read operation performed by the peripheral circuit and the storage operation of the operation information storage. The control logic may control the peripheral circuit and the operation information storage such that a storage section in which the operation information storage stores first setup information and a read section in which the peripheral circuit reads second setup information from the memory cell array are optionally overlapped with each other, based on whether option information about the read operation is stored in the operation information storage.

The control logic may control operations of the operation information storage and the peripheral circuit such that the storage section in which the operation information storage stores the first setup information and the read section in which the peripheral circuit reads the second setup information from the memory cell array are not overlapped with each other, when the option information about the read operation is not stored in the operation information storage.

The control logic may control the peripheral circuit to start the read operation of the second setup information after the first setup information is stored in the operation information storage.

The control logic may control operations of the operation information storage and the peripheral circuit such that the storage section in which the operation information storage stores the first setup information and the read section in which the peripheral circuit reads the second setup information from the memory cell array are overlapped with each other, when the option information about the read operation is stored in the operation information storage.

The control logic may control the peripheral circuit to start the read operation of the second setup information after a predetermined waiting period has passed from a time when the first setup information starts to be stored in the operation information storage.

The peripheral circuit may include a read and write circuit configured to read data stored in the memory cell array; and a data output circuit configured to temporarily store the data read from the memory cell array.

An embodiment of the present disclosure may provide a method of operating a semiconductor memory device including a memory cell array, a data input/output circuit and an operation information storage, the method including a first storage operation of reading setup information stored in a reserved area of the memory cell array and then storing the setup information in the operation information storage, by a first read method where a data storage section storing data, read from the memory cell array, in the operation information storage is separated from a data read section reading subsequent data from the memory cell array; determining whether option information about a read operation is stored in the operation information storage; and a second storage operation of reading the setup information stored in the reserved area of the memory cell array and then storing the information in the operation information storage, by the first read method or a second read method where the data storage section and the data read section are at least partially overlapped with each other, based on the determined result.

The first storage operation may include reading first setup information from the memory cell array; storing the first setup information in the operation information storage; and reading second setup information from the memory cell array, after the first setup information is stored in the operation information storage.

When it is determined that the option information about the read operation is not stored in the operation information storage, the second storage operation may include reading third setup information from the memory cell array; storing the third setup information in the operation information storage; and reading fourth setup information from the memory cell array, after the third setup information is stored in the operation information storage.

When it is determined that the option information about the read operation is stored in the operation information storage, the second storage operation may include reading third setup information from the memory cell array; starting an operation of storing the third setup information in the operation information storage; and determining whether a predetermined waiting period has passed; and starting an operation of reading fourth setup information from the memory cell array when the waiting period has passed.

DETAILED DESCRIPTION

Figure 1:
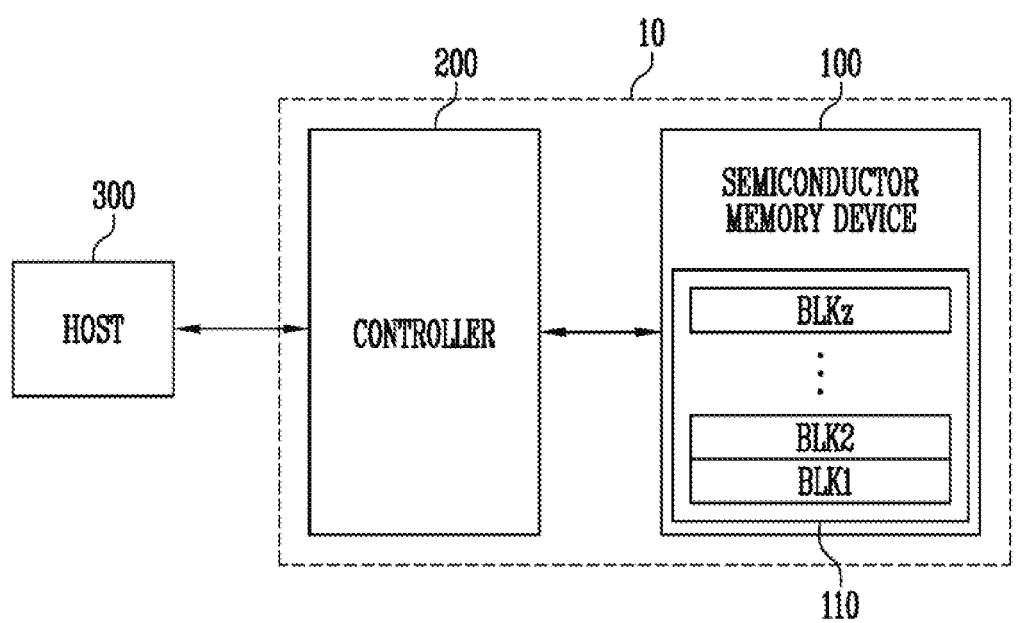
FIG. 1 is a block diagram illustrating a storage device.

Advantages and features of the present disclosure, and implementation methods thereof are clarified through embodiments described with reference to the accompanying drawings. The present disclosure may, however, be embodied in different forms and should not be construed as limited to the embodiments set forth herein. Rather, these embodiments are provided so that the present disclosure will be enabling to those skilled in the art.

It will be understood that when an element is referred to as being "coupled" or "connected" to another element, it can be directly coupled or connected to the other element or intervening elements may be present therebetween. In the specification, when an element is referred to as "comprising" or "including" a component, it does not preclude another component but may further include other components unless the context clearly indicates otherwise.

Hereinafter, embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure.

FIG. 1 is a block diagram illustrating a storage device 10.

Referring FIG. 1, the storage device 10 includes a semiconductor memory device 100 and a controller 200. The storage device 10 may communicate with a host 300. The semiconductor memory device 100 includes a memory cell array 110. The memory cell array 110 includes a plurality of memory blocks BLK1, BLK2, . . . , BLKz. The memory controller 200 may control the operation of the semiconductor memory device 100 based on a command received from the host 300.

Figure 2:
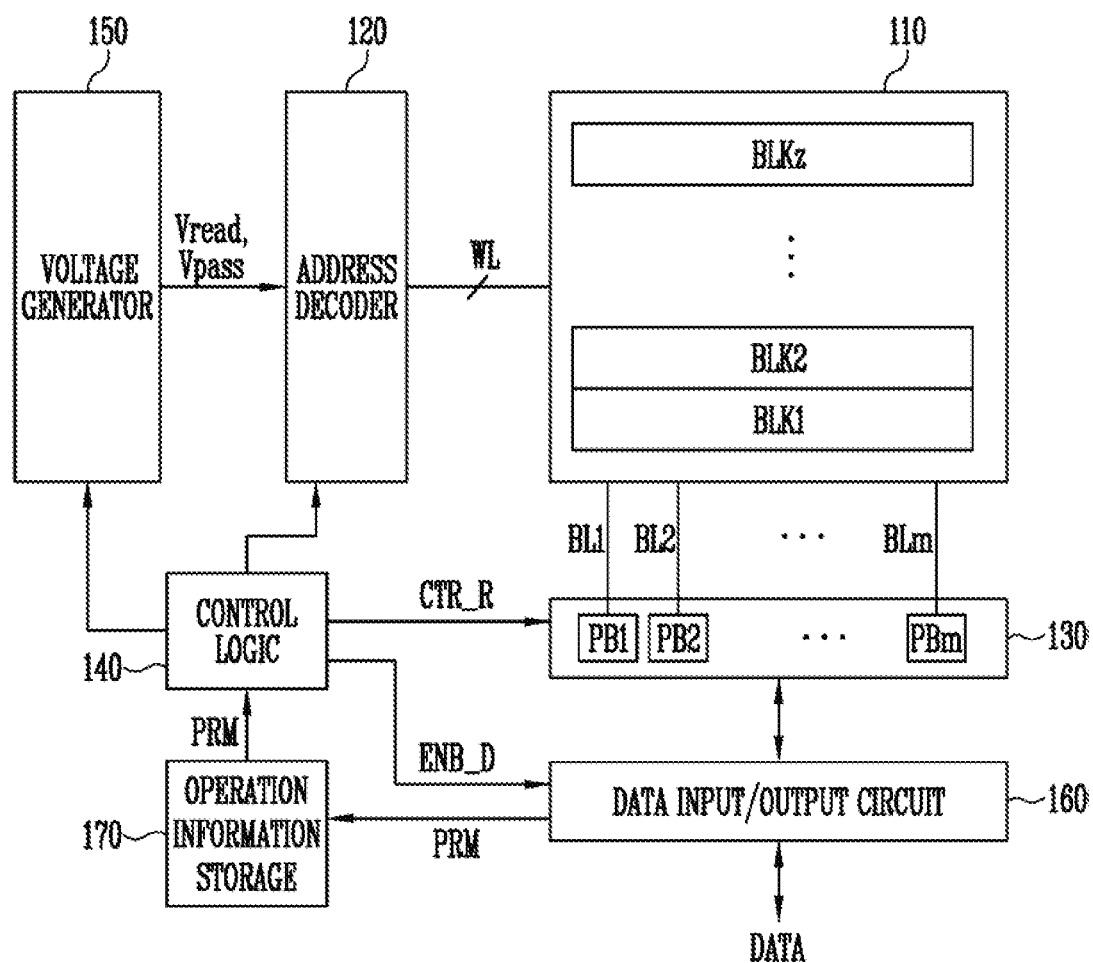
FIG. 2 is a block diagram illustrating a semiconductor memory device in accordance with an embodiment of the present disclosure.

FIG. 2 is a block diagram illustrating a semiconductor memory device 100 in accordance with an embodiment of the present disclosure.

Referring to FIG. 2, the semiconductor memory device 100 includes a memory cell array 110, an address decoder 120, a read and write circuit 130, control logic 140, a voltage generator 150, a data input/output circuit 160, and an operation information storage 170.

The memory cell array 110 includes a plurality of memory blocks BLK1 to BLKz. The memory blocks BLK1 to BLKz are coupled to the address decoder 120 through word lines WL. The memory blocks BLK1 to BLKz are coupled to the read and write circuit 130 through bit lines BL1 to BLm. Each of the memory blocks BLK1 to BLKz includes a plurality of memory cells. In an embodiment, the memory cells may be nonvolatile memory cells and be formed of nonvolatile memory cells having a vertical channel structure. The memory cell array 110 may be formed of a memory cell array having a two-dimensional structure. In an embodiment, the memory cell array 110 may be formed of a memory cell array having a three-dimensional structure.

Each of the memory cells included in the memory cell array may store at least one bit of data. In an embodiment, each of the memory cells included in the memory cell array 110 may be a single-level cell (SLC), which may store 1-bit data. In an embodiment, each of the memory cells included in the memory cell array 110 may be a multi-level cell (MLC), which may store 2-bit data. In an embodiment, each of the memory cells included in the memory cell array 110 may be a triple-level cell (TLC), which may store 3-bit data. In an embodiment, each of the memory cells included in the memory cell array 110 may be a quad-level cell, which may store 4-bit data. In various embodiments, the memory cell array 110 may include a plurality of memory cells each of which stores 5 or more bits of data.

The memory cell array 110 may include a user area and a reserved area. User data received from the host 300 may be stored in the user area. Data needed to perform the operation of the semiconductor memory device 100 may be stored in the reserved area. The reserved area may also be referred to as "content addressable memory (CAM) area". The CAM area may include a plurality of memory cells included in at least one memory block. A memory block corresponding to the CAM area may be a CAM block. The CAM block and the memory block may have the same structure. Setup information of the semiconductor memory device 100 may be stored in the CAM area.

In detail, setting conditions or other information pertaining to a data input/output operation may be stored in the CAM area. In an embodiment, information about a read and write operation count (P/E Cycle), a bad column address, and a bad block address may be stored in the CAM area. In an embodiment, needed to operation the semiconductor memory device 100, option information, e.g., program voltage information, read voltage information, erase voltage information, or information about a thickness of a gate oxide layer of a cell, may be stored in the CAM area. In an embodiment, repair information may be stored in the CAM area. If power is supplied to the semiconductor memory device 100, information stored in the CAM area is read by the read and write circuit 130 and stored in the operation information storage 170 via the data input/output circuit 160. The control logic 140 may control peripheral circuits, for example, the address decoder 120, the read and write circuit 130, the voltage generator 150, and the data input/output circuit 160, to perform overall operations on the memory cell array 110 under set conditions based on the information stored in the operation information storage 170. The user area and the reserved area of the memory cell array 110 will be described below with reference to FIG. 7.

The address decoder 120 may decode a block address among the received addresses. The address decoder 120 may select at least one memory block based on the decoded block address. When a read voltage application operation is performed during a read operation, the address decoder 120 may apply a read voltage Vread generated from the voltage generator 150, to a selected word line of a selected memory block and apply a pass voltage Vpass to the other unselected word lines. During a program verify operation, the address decoder 120 may apply a verify voltage generated from the voltage generator 150, to a selected word line of a selected memory block, and apply a pass voltage Vpass to the other unselected word lines.

The address decoder 120 may decode a column address among the received addresses. The address decoder 120 may transmit the decoded column address to the read and write circuit 130.

The read or program operation of the semiconductor memory device 100 is performed on a page basis. Addresses received in a request for a read or program operation may include a block address, a row address and a column address. The address decoder 120 may select one memory block and one word line based on the block address and the row address. The column address may be decoded by the address decoder 120 and provided to the read and write circuit 130.

The address decoder 120 may include a block decoder, a row decoder, a column decoder, an address buffer, etc.

The read and write circuit 130 includes a plurality of page buffers PB1 to PBm. The read and write circuit 130 may be operated as a read circuit during a read operation of the memory cell array 110 and as a write circuit during a write operation. The page buffers PB1 to PBm are coupled to the memory cell array 110 through the bit lines BL1 to BLm. During a read operation or a program verify operation, to sense threshold voltages of the memory cells, the page buffers PB1 to PBm may continuously supply sensing current to the bit lines coupled to the memory cells, and each page buffer may sense, through a sensing node, a change in the amount of flowing current depending on a programmed state of a corresponding memory cell and latch it as sensing data. During the read operation, the read and write circuit 130 is operated in response to a read control signal CTR_R output from the control logic 140.

During the read operation, the read and write circuit 130 may sense data of the memory cells and temporarily store read data, and then output data DATA to the input/output circuit 160. In an embodiment, the read and write circuit 130 may include a column select circuit or the like as well as the page buffers PB1 to PBm.

The control logic 140 may be implemented as hardware, software, or a combination of hardware and software. For example, the control logic 140 may be a control logic circuit operating in accordance with an algorithm and/or a processor executing control logic code. The control logic 140 is coupled to the address decoder 120, the read and write circuit 130, the voltage generator 150, the data input/output circuit 160, and the operation information storage 170. The control logic 140 may receive a command CMD and a control signal CTRL through the input/output buffer (not shown) of the semiconductor memory device 100. The control logic 140 may control the overall operation of the semiconductor memory device 100 in response to the control signal CTRL. The control logic 140 may output a control signal for controlling the sensing node precharge potential levels of the plurality of page buffers PB1 to PBm. The control logic 140 may control the read and write circuit 130 to perform a read operation, a write operation, or an erase operation of the memory cell array 110.

The voltage generator 150 may generate a read voltage Vread and a pass voltage Vpass during a read operation in response to a control signal output from the control logic 140. Although not illustrated in FIG. 2, the voltage generator 150 may generate, for example, a program voltage which is used during a program operation, or an erase voltage which is used during an erase operation. The voltage generator 150 may include, so as to generate a plurality of voltages having various voltage levels, a plurality of pumping capacitors configured to receive an internal supply voltage, and may generate a plurality of voltages by selectively enabling the plurality of pumping capacitors under control of the control logic 140.

The data input/output circuit 160 may include a plurality of input/output buffers (not shown) for receiving inputted data. During a program operation, the data input/output circuit 160 may receive data DATA to be stored from an external controller (not shown). During a read operation, the data input/output circuit 160 may output data, transmitted from the page buffers PB1 to PBm included in the read and write circuit 130, to the external controller.

The address decoder 120, the read and write circuit 130, the voltage generator 150, and the data input/output circuit 160 are operated as peripheral circuits for driving the memory cell array 110. In other words, the address decoder 120, the read and write circuit 130, the voltage generator 150, and the data input/output circuit 160 may function as peripheral circuits for performing a read operation, a write operation, or an erase operation on the memory cell array 110. The peripheral circuits may perform a read operation, a write operation, or an erase operation on the memory cell array 110 under control of the control logic 140.

The operation information storage 170 may store data needed to perform the semiconductor memory device 100. For example, the setup information stored in the reserved area of the memory cell array 110 may be stored in the operation information storage 170. The operation information storage 170 may be formed of a volatile memory such as a resistor. Hence, the while no power is supplied to the semiconductor memory device 10, the operation information storage 170 might not store data.

When the semiconductor memory device 100 is turned on, the setup information PRM stored in the reserved area of the memory cell array 110 is read and stored in the operation information storage 170. During this process, the control logic 140 may control a data read operation of the read and write circuit 130 through a read control signal CTR_R. Furthermore, the control logic 140 may control a data output operation of the data input/output circuit 160 through a data output control signal ENB_D. The setup information PRM stored in the operation information storage 170 may be transmitted to the control logic 140 and used for the operation of the semiconductor memory device 100.

In the semiconductor memory device 100 in accordance with an embodiment of the present disclosure, during an initialization operation, a read period and a storage period of the setup information PRM may overlap with each other. Therefore, the time it takes to initialize the semiconductor memory device 100 may be reduced. Consequently, the operating speed of the semiconductor memory device 100 may be enhanced.

Figure 3:
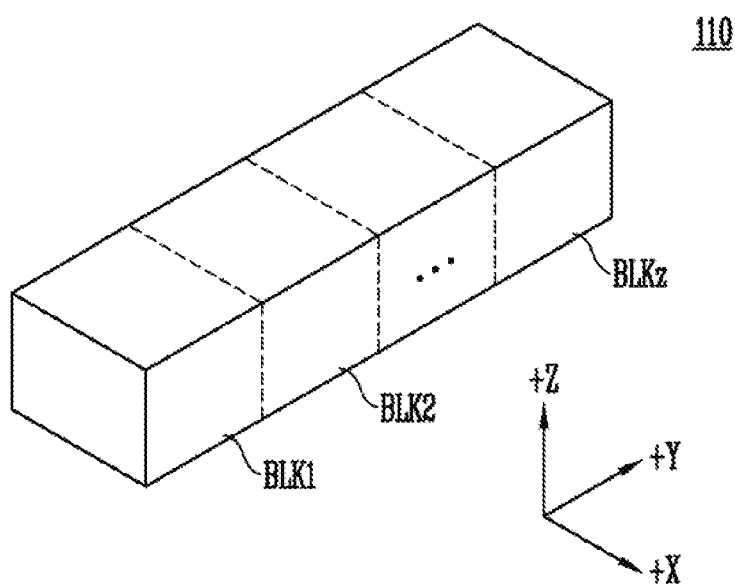
FIG. 3 is a diagram illustrating a memory cell array of FIG. 2.

FIG. 3 is a diagram illustrating an embodiment of the memory cell array 110 of FIG. 2.

Referring to FIG. 3, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block is described in more detail with reference to FIGS. 4 and 5.

Figure 4:
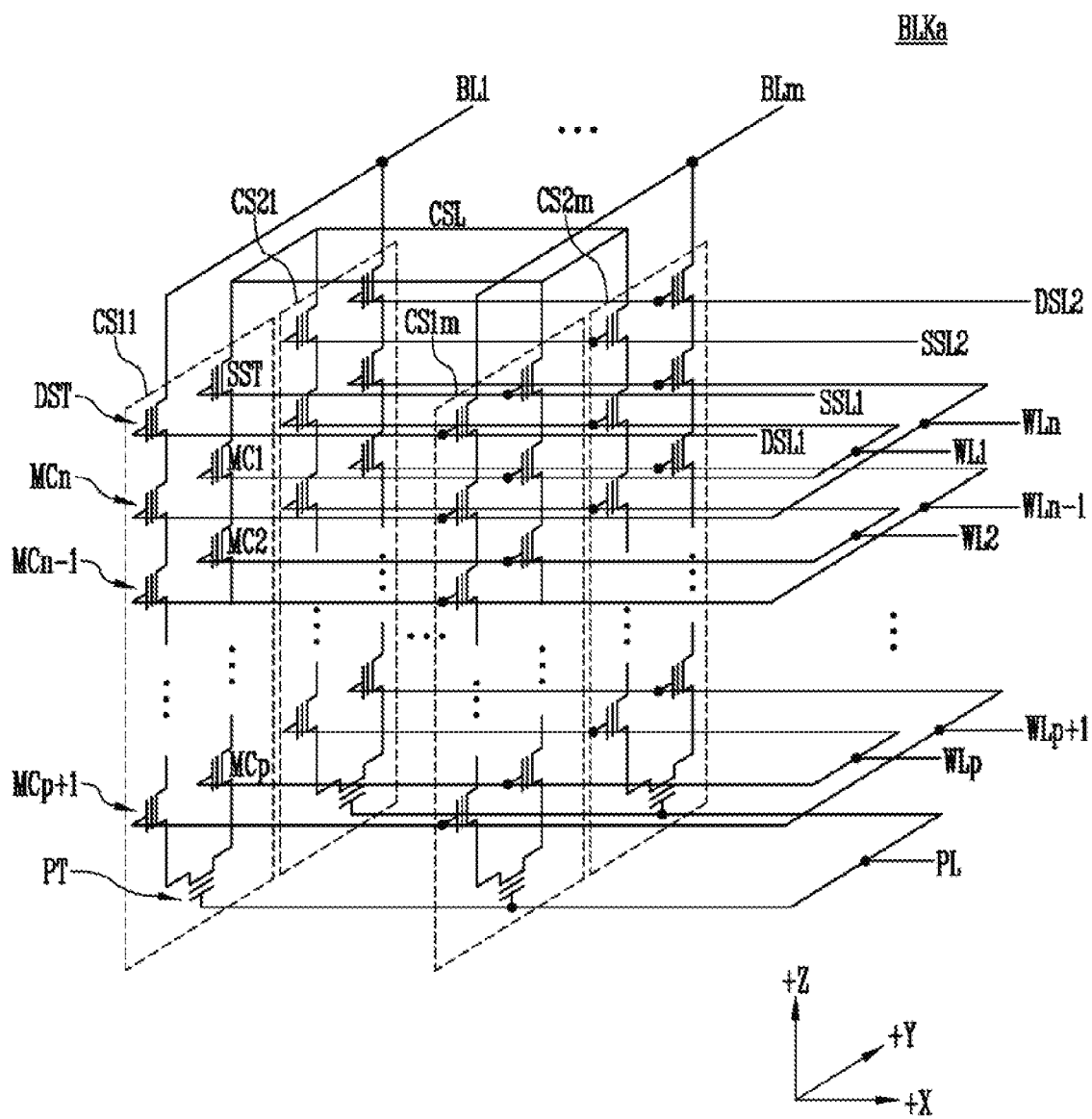
FIG. 4 is a circuit diagram illustrating a memory block of FIG. 3, in accordance with an embodiment of the present disclosure.

FIG. 4 is a circuit diagram illustrating any one memory block BLKa of memory blocks BLK1 to BLKz of FIG. 3, in accordance with an embodiment of the present disclosure.

Referring to FIG. 4, the memory block BLKa may include a plurality of cell strings CS11 to CS1*m* and CS21 to CS2*m*. In an embodiment, each of the cell strings CS11 to CS1*m* and CS21 to CS2*m* may be formed in a 'U' shape. In the memory block BLKa, m cell strings may be arranged in a row direction (i.e., the +X direction). In FIG. 4, two cell strings are illustrated as being arranged in a column direction (i.e., the +Y direction). However, this illustration is made only for convenience of description, and it will be understood that three or more cell strings may be arranged in the column direction.

Each of the plurality of cell strings CS11 to CS1*m* and CS21 to CS2*m* may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 4, source select transistors of the cell strings CS11 to CS1*m* in a first row are coupled to a first source select line SSL1. Source select transistors of the cell strings CS21 to CS2*m* in a second row are coupled to a second source select line SSL2.

In another embodiment, the source select transistors of the cell strings CS11 to CS1*m* and CS21 to CS2*m* may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are successively arranged in a direction opposite to the +Z direction and are coupled in series between the source select transistor SST and the pipe transistor PT. The p+1-th to n-th memory cells MCp+1 to MCn are successively arranged in the +Z direction and are coupled in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1*m* in the first row are coupled to a first drain select line DSL1. Drain select transistors of the cell strings CS21 to CS2*m* in the second row are coupled to a second drain select line DSL2.

Cell strings arranged in the column direction may be coupled to bit lines extending in the column direction. In FIG. 4, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In another embodiment, even bit lines and odd bit lines may be provided in lieu of the first to m-th bit lines BL1 to BLm. Even-numbered cell strings of the cell strings CS11 to CS1m or CS21 to CS2m arranged in the row direction may be coupled to respective even-numbered bit lines. Odd-numbered cell strings of the cell strings CS11 to CS1m or CS21 to CS2m arranged in the row direction may be coupled to respective odd-numbered bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 5:
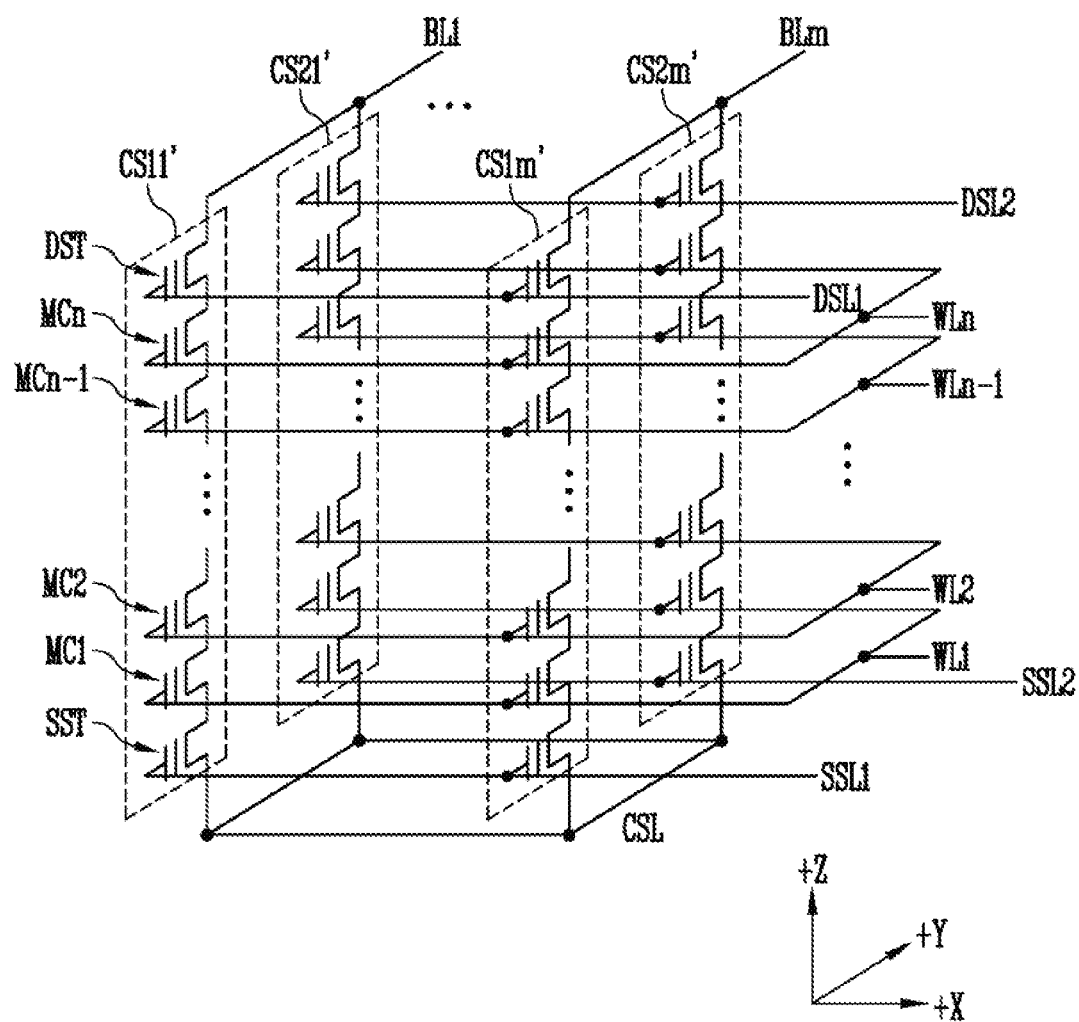
FIG. 5 is a circuit diagram illustrating a memory block of FIG. 3, in accordance with an embodiment of the present disclosure.

FIG. 5 is a circuit diagram illustrating any one memory block BLKb of the memory blocks BLK1 to BLKz of FIG. 3, in accordance with an embodiment of the present disclosure.

Referring to FIG. 5, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLKb.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequently, the memory block BLKb of FIG. 5 may have an equivalent circuit similar to that of the memory block BLKa of FIG. 4 except that a pipe transistor PT is excluded from each cell string.

In another embodiment, even bit lines and odd bit lines may be provided in lieu of the first to m-th bit lines BL1 to BLm. Even-numbered cell strings among the cell strings CS11' to CS1m' or CS21' to CS2m' arranged in the row direction may be coupled to the respective even-numbered bit lines, and odd-numbered cell strings among the cell strings CS11' to CS1m' or CS21' to CS2m' arranged in the row direction may be coupled to the respective odd-numbered bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 6:
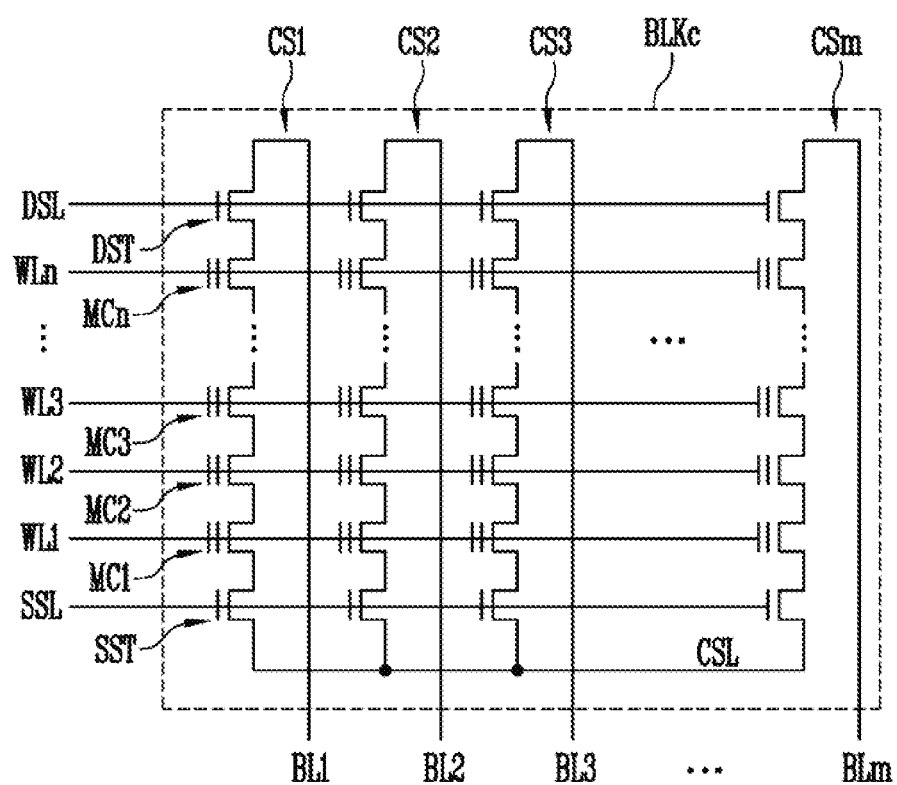
FIG. 6 is a circuit diagram illustrating a memory block of FIG. 2, in accordance with an embodiment of the present disclosure.

FIG. 6 is a circuit diagram illustrating any one memory block BLKc of the memory blocks BLK1 to BLKz included in the memory cell array 110 of FIG. 2, in accordance with an embodiment of the present disclosure.

Referring to FIG. 6, the memory block BLKc includes a plurality of cell strings CS1 to CSm. The plurality of cell strings CS1 to CSm may be respectively coupled to a plurality of bit lines BL1 to BLm. Each of the cell strings CS1 to CSm includes at least one source select transistor SST, first to n-th memory cells MC1 to MCn, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCn.

The first to n-th memory cells MC1 to MCn in each cell string are coupled between the source select transistor SST and the drain select transistor DST.

The drain select transistor DST of each cell string is coupled between the corresponding bit line and the memory cells MC1 to MCn.

Memory cells coupled to the same word line may form a single page. The cell strings CS1 to CSm may be selected by selecting the drain select line DSL. When any one of the word lines WL1 to WLn is selected, a corresponding single page may be selected from among the selected cell strings.

In another embodiment, even bit lines and odd bit lines may be provided in lieu of the first to m-th bit lines BL1 to BLm. Even-numbered cell strings of the cell strings CS1 to CSm may be coupled to the respective even-numbered bit lines, and odd-numbered cell strings may be coupled to the respective odd-numbered bit lines.

Figure 7:
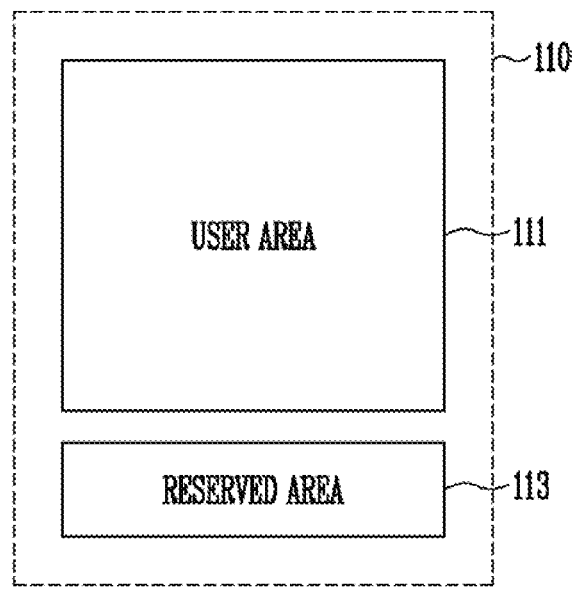
FIG. 7 is a diagram illustrating the storage area of the memory cell array of FIG. 2.

FIG. 7 is a diagram illustrating the storage area of the memory cell array 110 of FIG. 2.

Referring to FIG. 7, the memory cell array 110 may include a user area 111 and a reserved area 113. User data received from the host 300 may be stored in the user area 111. As described above, data required to perform the operation of the semiconductor memory device 100 may be stored in the reserved area 113. The reserved area may be referred to as "content addressable memory (CAM) area". The CAM area may include a plurality of memory cells included in at least one memory block. A memory block corresponding to the CAM area may be a CAM block. The CAM block and the memory block may have the same structure. Setup information of the semiconductor memory device 100 may be stored in the CAM area.

Figure 8:
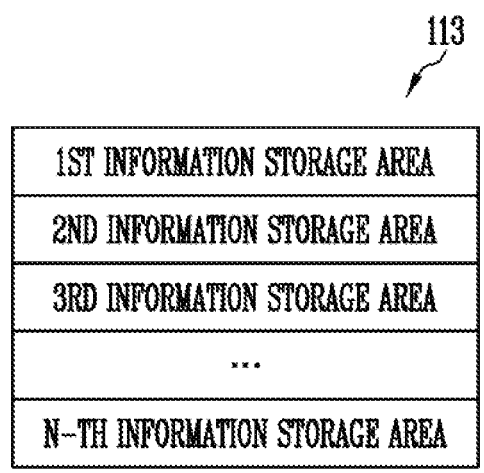
FIG. 8 is a diagram illustrating a reserved area of FIG. 7.

FIG. 8 is a diagram illustrating the reserved area 113 of FIG. 7.

Referring to FIG. 8, the reserved area 113 may include a plurality of storage areas. To be more specific, the reserved area 113 may include first to N-th information storage areas. Information stored in each storage area may be read by a read and write circuit 130 and then transferred to an operation information storage 170 through a data input/output circuit 160.

Each information storage area of the reserved area 113 may be classified by page. For example, the first information storage area may correspond to a first page, and the second information storage area may correspond to a second page. The N-th information storage area may correspond to an N-th page.

Figure 9:
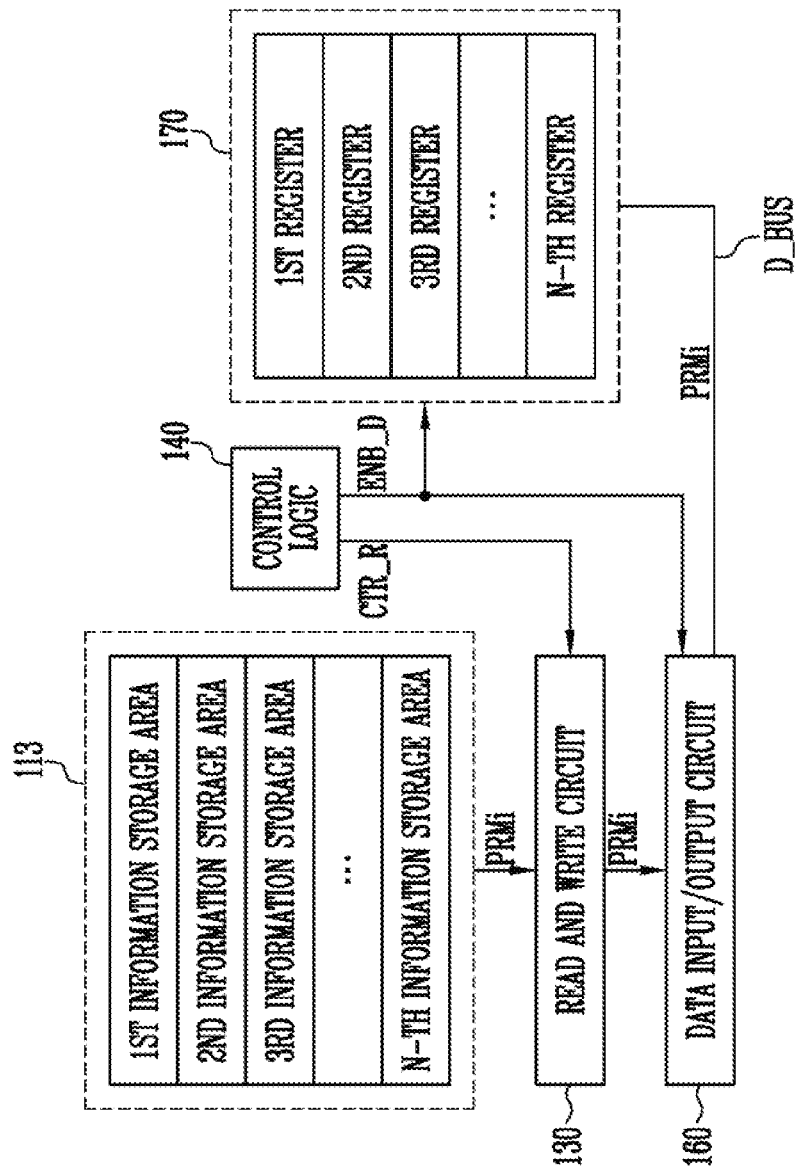
FIG. 9 is a block diagram illustrating the operation of the semiconductor memory device of FIG. 2.

FIG. 9 is a block diagram illustrating the operation of the semiconductor memory device of FIG. 2.

Referring to FIG. 9, the block diagram for explaining the operation in which data stored in the reserved area 113 is stored in the operation information storage 170 is illustrated. For the convenience of description, FIG. 9 illustrates only a part of the semiconductor memory device 100 of FIG. 2. That is, among the components illustrated in FIG. 2, only the reserved area 113 of the memory cell area 110, the read and write circuit 130, the control logic 140, the data input/output circuit 160 and the operation information storage 170 are illustrated in FIG. 9, and other components are not illustrated. As illustrated in FIG. 9, the operation information storage 170 may include first to N-th registers.

When the semiconductor memory device 100 is switched from a turn-off state to a turn-on state, the setup information stored in the reserved area 113 is read and stored in the operation information storage 170. During this process, the control logic 140 controls the read operation of the read and write circuit 130 through the read control signal CTR_R. The read and write circuit 130 sequentially reads the setup information PRMi stored in the reserved area 113 of the memory cell array 110 and then transfers the information to the data input/output circuit 160, based on the read control signal CTR_R. The setup information PRMi read by the read and write circuit 130 is stored in the data input/output circuit 160. The control logic 140 controls the data output operation of the data input/output circuit 160 and the data storage operation of the operation information storage 170 through the data output control signal ENB_D. To be more specific, the data input/output circuit 160 outputs the stored setup information PRMi to the data bus D_BUS based on the data output control signal ENB_D outputted from the control logic 140. Meanwhile, based on the data output control signal ENB_D, the operation information storage 170 stores the setup information PRMi outputted to the data bus D_BUS. According to a embodiment, the setup information stored in the first to N-th information storage areas of the reserved area 113 may be stored in the first to N-th registers of the operation information storage 170.

Figure 10:
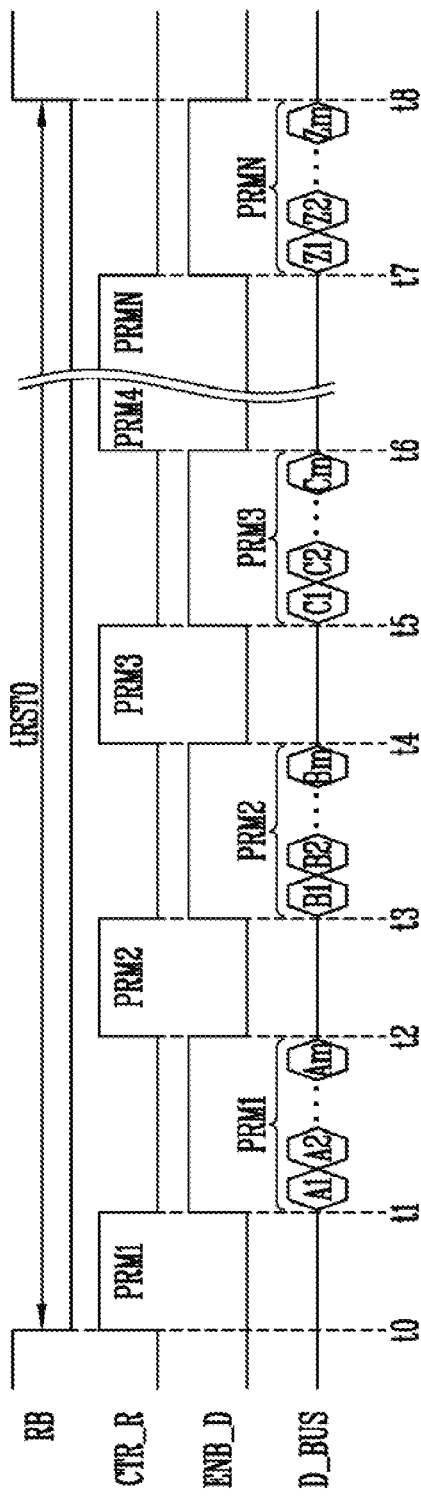
FIG. 10 is a timing diagram illustrating the operation of a general semiconductor memory device.

FIG. 10 is a timing diagram illustrating the operation of a general semiconductor memory device.

Referring to FIG. 10, the timing diagram of a ready/busy signal (RB), a read control signal CTR_R, a data output control signal ENB_D and a data bus D_BUS of the semiconductor memory device are illustrated. The ready/busy signal RB is a signal that is outputted via a ready/busy pin (not shown) from the semiconductor memory device 100 to the controller 200, and indicates whether the semiconductor memory device 100 is in a ready state or a busy state. For instance, when the ready/busy signal RB is in a logic-high state, the controller 200 may recognize that the semiconductor memory device 100 is in the ready state. Meanwhile, when the ready/busy signal RB is in a logic-low state, the controller 200 may recognize that the semiconductor memory device 100 is in the busy state. FIG. 10 illustrates an embodiment in which the ready/busy signal is in the logic-high state when the semiconductor memory device 100 is in the ready state, and the ready/bush signal is in the logic-low state when the semiconductor memory device 100 is in the busy state. However, according to an embodiment, the ready/busy signal may be in the logic-low state when the semiconductor memory device 100 is in the ready state, and the ready/bush signal may be in the logic-high state when the semiconductor memory device 100 is in the busy state.

When the semiconductor memory device 100 is turned on, it is necessary to read the setup information stored in the reserved area 113 into the operation information storage for the purpose of initialization. To this end, an initialization operation is started at time t0. To be more specific, at time t0, the ready/busy signal is changed into the logic-low state, and the read control signal CTR_R is activated to the logic-high state.

In response to the activated read control signal CTR_R, the read and write circuit 130 reads the first setup information PRM1 in the reserved area 113 of the memory cell array 110 during the period from t0 to t1. According to an embodiment, the first setup information PRM1 may be stored in the first information storage area of the reserved area 113. The period from t0 to t1 may be a time required to read the first setup information PRM1 and then store it in the data input/output circuit 160.

If all of the first setup information PRM1 is read and stored in the data input/output circuit 160 at time t1, the read control signal CTR_R is deactivated to the logic-low state and the data output control signal ENB_D is activated to the logic-high state. During the period from t1 to t2, the data input/output circuit 160 outputs the first setup information PRM1 to the data bus D_BUS, in response to the activated data output control signal ENB_D. The first setup information PRM1 may be composed of a plurality of bits A1 to Am. Meanwhile, in response to the activated data output control signal ENB_D, the operation information storage 170 may store the first setup information PRM1 outputted to the data bus D_BUS. According to an embodiment, the first setup information PRM1 may be stored in the first register of the operation information storage 170.

If the first setup information PRM1 has been stored in time t2, the read control signal CTR_R is activated to the logic-high state so as to read the second setup information PRM2.

In response to the activated read control signal CTR_R, the read and write circuit 130 reads the second setup information PRM2 in the reserved area 113 of the memory cell array 110 during the period from t2 to t3. If all of the second setup information PRM2 is read and stored in the data input/output circuit 160 at time t3, the read control signal CTR_R is deactivated to the logic-low state and the data output control signal ENB_D is activated to the logic-high state. During the period from t3 to t4, the data input/output circuit 160 outputs the second setup information PRM2 to the data bus D_BUS, in response to the activated data output control signal ENB_D. The second setup information PRM2 may be composed of a plurality of bits B1 to Bm. Meanwhile, in response to the activated data output control signal ENB_D, the operation information storage 170 may store the second setup information PRM2 outputted to the data bus D_BUS. According to an embodiment, the second setup information PRM2 may be stored in the second register of the operation information storage 170.

In this way, the third setup information PRM3 to the N-th setup information PRMN may also be stored in the operation information storage 170. If all of the first to N-th setup information PRM1 to PRMN are stored in the operation information storage 170 at time t8, the initialization of the semiconductor memory device 100 may be completed. Thus, the ready/bush signal RB is changed to the logic-high state at time t8.

In FIG. 10, the initialization time tRST0 for the period from t0 to t8 is required to initialize the semiconductor memory device 100. In order to store the setup information PRM1 to PRMN, stored in the reserved area 113, in the operation information storage 170, the read section of the setup information may be separated from the storage section of the setup information.

To be more specific, in FIG. 10, the read section of the first setup information PRM1 is the period from t0 to t1, and the storage section of the first setup information PRM1 is the period from t1 to t2. Meanwhile, the read section of the second setup information PRM2 is the period from t2 to t3, and the storage section of the second setup information PRM2 is the period from t3 to t4. In this way, the read sections of the setup information might not be overlapped with the storage sections of the setup information, but may be separated in time from the storage sections. The read setup information starts to be stored after the setup information has been read, and next setup information starts to be read after the setup information is stored. Thus, setup information may be stably stored in the operation information storage 170 in the initialization process of the semiconductor memory device 100. In this case, however, a relatively long initialization time tRST0 is required, which may be a factor for reducing the operating speed of the semiconductor memory device 100.

In at least some section of the semiconductor memory device 100 according to an embodiment of the present disclosure, the read section and the storage section of the setup information overlap with each other. Therefore, the time it takes to initialize the semiconductor memory device 100 may be reduced. Consequently, the operating speed of the semiconductor memory device 100 may be enhanced.

Figure 11:
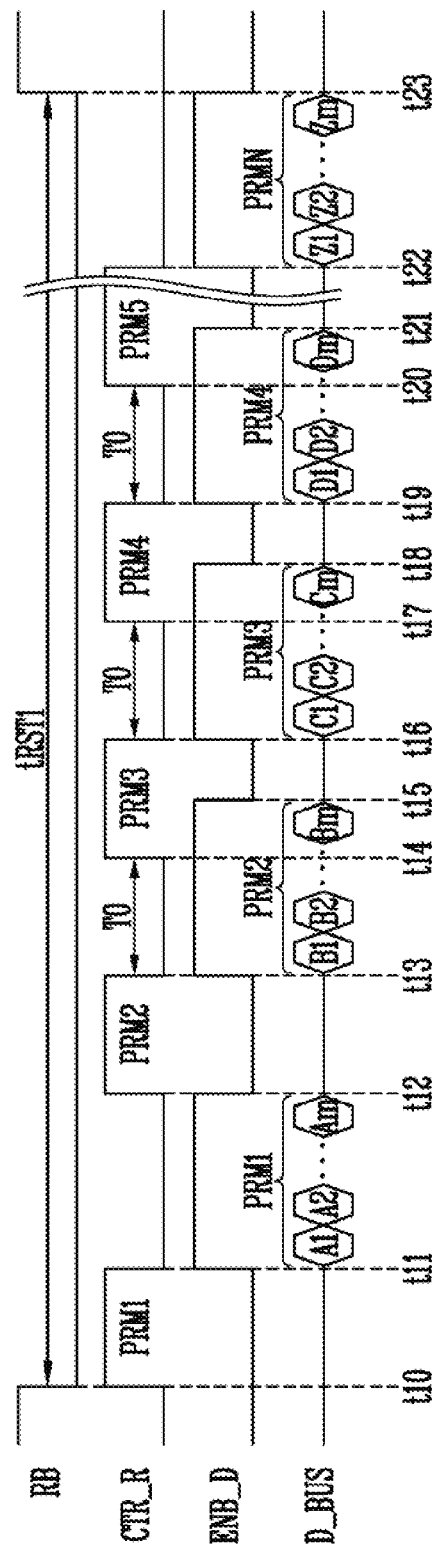
FIG. 11 is a timing diagram illustrating the operation of the semiconductor memory device in accordance with an embodiment of the present disclosure.

FIG. 11 is a timing diagram illustrating the operation of the semiconductor memory device in accordance with an embodiment of the present disclosure.

Referring to FIG. 11, the timing diagram of a ready/bush signal (RB), a read control signal CTR_R, a data output control signal ENB_D and a data bus D_BUS of the semiconductor memory device 100 according to the embodiment of the present disclosure are illustrated. Hereinafter, descriptions for the elements already described with reference to FIG. 10 are not repeated.

When the semiconductor memory device 100 in accordance with an embodiment of the present disclosure is turned on, it is necessary to read the setup information stored in the reserved area 113 into the operation information storage for the purpose of initialization. To this end, the initialization operation is started at time t10. To be more specific, at time t10, the ready/busy signal is changed into the logic-low state, and the read control signal CTR_R is activated to the logic-high state.

In response to the activated read control signal CTR_R, the read and write circuit 130 reads the first setup information PRM1 in the reserved area 113 of the memory cell array 110 during the period from t10 to t11. According to an embodiment, the first setup information PRM1 may be stored in the first information storage area of the reserved area 113. The period from t10 to t11 may be a time required to read the first setup information PRM1 and then store it in the data input/output circuit 160.

If all of the first setup information PRM1 is read and stored in the data input/output circuit 160 at time t11, the read control signal CTR_R is deactivated to the logic-low state and the data output control signal ENB_D is activated to the logic-high state. During the period from t11 to t12, the data input/output circuit 160 outputs the first setup information PRM1 to the data bus D_BUS, in response to the activated data output control signal ENB_D. The first setup information PRM1 may be composed of a plurality of bits A1 to Am. Meanwhile, in response to the activated data output control signal ENB_D, the operation information storage 170 may store the first setup information PRM1 outputted to the data bus D_BUS. According to an embodiment, the first setup information PRM1 may be stored in the first register of the operation information storage 170.

If the first setup information PRM1 has been stored in time t12, the read control signal CTR_R is activated to the logic-high state so as to read the second setup information PRM2.

In response to the activated read control signal CTR_R, the read and write circuit 130 reads the second setup information PRM2 in the reserved area 113 of the memory cell array 110 during the period from t12 to t13. If all of the second setup information PRM2 is read and stored in the data input/output circuit 160 at time t13, the read control signal CTR_R is deactivated to the logic-low state and the data output control signal ENB_D is activated to the logic-high state.

During the period from t10 to t13, the operation of reading and storing the first setup information PRM1 and of reading the second setup information PRM2 may be performed to be substantially equal to the operation of FIG. 10 during the period from t0 to t3.

During the following period from t13 to t15, in response to the activated data output control signal ENB_D, the data input/output circuit 160 outputs the second setup information PRM2 to the data bus D_BUS, and the operation information storage 170 stores the second setup information PRM2 outputted to the data bus D_BUS. At time t15 when the second setup information PRM2 is stored in the operation information storage 170, the data output control signal ENB_D may be deactivated.

Meanwhile, the read control signal CTR_R is activated at time t14 after a predetermined waiting period t0 has passed from time t13. In response to the activated read control signal CTR_R, the read and write circuit 130 reads the third setup information PRM3 in the reserved area 113 of the memory cell array 110 during the period from t14 to t16.

In FIG. 11, time t14 is ahead of time t15 at which the second setup information PRM2 has been stored. Thus, at period from t14 to t15, the operation of storing the second setup information PRM2 in the operation information storage 170 and the operation of reading the third setup information PRM3 from the reserved area 113 are simultaneously performed. That is, before the operation of storing the second setup information PRM2 in the operation information storage 170 is completed, the operation of reading the third setup information PRM3 from the reserved area 113 is started.

Subsequently, if the operation of reading the third setup information PRM3 is completed at time t16, the data output control signal ENB_D is activated. During the period from t16 to t18, in response to the activated data output control signal ENB_D, the data input/output circuit 160 outputs the third setup information PRM3 to the data bus D_BUS, and the operation information storage 170 stores the third setup information PRM3 outputted to the data bus D_BUS. At time t18 when the third setup information PRM3 is stored in the operation information storage 170, the data output control signal ENB_D may be deactivated.

Meanwhile, the read control signal CTR_R is activated at time t17 after a predetermined waiting period t0 has passed from time t16. In response to the activated read control signal CTR_R, the read and write circuit 130 reads the fourth setup information PRM4 in the reserved area 113 of the memory cell array 110 during the period from t17 to t19.

In this way, the fourth setup information PRM4 to the N-th setup information PRMN may also be stored in the operation information storage 170. If all of the first to N-th setup information PRM1 to PRMN are stored in the operation information storage 170 at time t23, the initialization of the semiconductor memory device 100 may be completed. Thus, the ready/bush signal RB is changed to the logic-high state at time t23.

As illustrated in FIG. 11, in the semiconductor memory device 100 and the method of operating the device according to an embodiment of the present disclosure, while the setup information that has been read is stored in the operation information storage 170, it is possible to start reading the setup information of the next sequence from the reserved area 113. In this case, if the predetermined waiting period t0 has elapsed from a time when the setup information has been read, the next setup information is started to be read regardless of whether the operation of storing the setup information has been completed.

In this way, some of the read sections of the setup information may be overlapped with some of the storage sections of the setup information. By partially overlapping the read section and the storage section of the setup information, the initialization time tRST1 of the semiconductor memory device 100 can be reduced. Thus, comparing FIG. 10 and FIG. 11, the initialization time tRST1 of FIG. 11 will be relatively shorter than the initialization time tRST0 of FIG. 10. Thus, the semiconductor memory device 100 may be initialized through a shorter initialization time tRST1, and consequently the operating speed of the semiconductor memory device 100 is enhanced.

Referring to FIG. 11, while the first setup information PRM1 is stored in the operation information storage 170, the operation of reading the second setup information PRM2 is not started. Subsequently, while the second setup information PRM2 is stored in the operation information storage 170, the operation of reading the third setup information PRM3 is started. As such, in an embodiment, the storage section t11 to t12 of the first setup information PRM1 might not be overlapped with the read section t12 to t13 of the second setup information PRM2, and then the storage section t13 to t15 of the second setup information PRM2 may be partially overlapped with the read section t14 to t16 of the third setup information PRM3. In most cases, the first setup information PRM1 may include set values related to the read operation for reading the memory cell array 110. The set values related to the read operation may include, for example, read voltage information or the like.

The read operation of the semiconductor memory device 100 may be unstable before the set values related to the read operation are stored in the operation information storage 170. Therefore, before the set values related to the read operation are stored in the operation information storage 170 (e.g. t10 to t12), it is possible to stably initialize the semiconductor memory device by configuring such that the storage operation of the setup information is not overlapped with the read section of the next setup information. Thereafter, after the set values related to the read operation are stored in the operation information storage 170 (e.g. t12 to t13), it is possible to more rapidly initialize the semiconductor memory device by configuring such that the storage operation of the setup information is at least partially overlapped with the read section of the next setup information.

FIG. 11 illustrates an embodiment in which the set values related to the read operation are included in the first setup information PRM1. According to an embodiment, the read operation may be included in the third setup information PRM3. In this case, before the third setup information PRM3 is stored in the operation information storage 170, the storage section of the setup information might not be overlapped with the read section of the next setup information. After the third setup information PRM3 is stored in the operation information storage 170, the storage section of the setup information may be at least partially overlapped with the read section of the next setup information.

Figure 12:
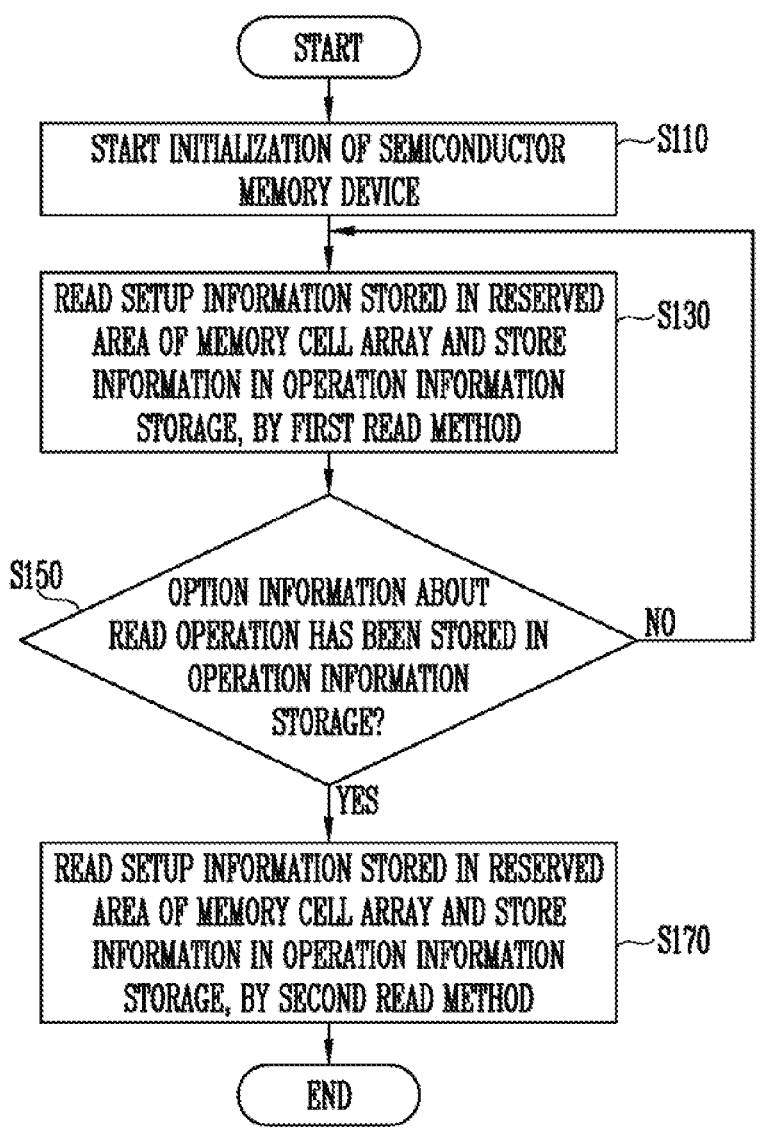
FIG. 12 is a flowchart illustrating a method of operating the semiconductor memory device of FIG. 2 in accordance with an embodiment of the present disclosure.

FIG. 12 is a flowchart illustrating a method of operating the semiconductor memory device in accordance with an embodiment of the present disclosure.

Referring to FIG. 12, the method of operating the semiconductor memory device in accordance with the embodiment of the present disclosure includes operation S110 of starting the initialization of the semiconductor memory device, operation S130 of reading the setup information stored in the reserved area 113 of the memory cell array 110 by a first read method and storing the information in the operation information storage, operation S150 of determining whether option information about the read operation has been stored in the operation information storage, and operation S170 of reading the setup information stored in the reserved area 113 of the memory cell area 110 by a second read method and storing the information in the operation information storage.

When power is supplied to the semiconductor memory device 100, the initialization of the semiconductor memory device is started at S110. Thus, the semiconductor memory device 100 may change the ready/busy signal RB into a logic-low state, and may start reading the setup information stored in the reserved area 113 of the memory cell array 110.

At operation 130, the setup information PRM stored in the reserved area 113 is read by the "first read method" and then stored in the operation information storage. The first read method may mean a method in which the storage section for storing the read setup information in the operation information storage 170 is not overlapped with the read section for reading the next setup information. Thus, as in the period from t10 to t12 of FIG. 11, the storage section and the read section of the setup information are not overlapped with but are separated from each other in time.

At operation S150, it is determined whether the option information about the read operation has been stored in the operation information storage. The option information about the read operation may be the set value related to the read operation. As described above, before the option information about the read operation that is the set value related to the read operation is stored in the operation information storage 170, the storage operation of the setup information might not be overlapped with the read section of the next setup information to stably initialize the semiconductor memory device 100. Thus, if the option information about the read operation has not been stored in the operation information storage (S150: No), the process proceeds to operation S130 to perform the read operation and the storage operation of the setup information by the first read method. FIG. 11 illustrates an example in which the option information about the read operation is included in the first setup information PRM1. Thus, in the period from t10 to t12, the setup information PRM stored in the reserved area 113 is read by the first read method and then stored in the operation information storage. That is, based on whether the option information about the read operation is stored in the operation information storage 170, either of the first read method or the second read method is selected to read the setup information. A method of reading the setup information PRM stored in the reserved area 113 by the first read method and storing the information in the operation information storage will be described below in more detail with reference to FIG. 13.

If the option information about the read operation has been stored in the operation information storage (S150: Yes), the setup information stored in the reserved area 113 of the memory cell array 110 is read by the second read method and then stored in the operation information storage at operation S170. The "second read method" may mean a method in which the storage section for storing the read setup information in the operation information storage 170 is at least partially overlapped with the read section for reading the next setup information. The method of reading the setup information PRM stored in the reserved area 113 by the second read method and storing the information in the operation information storage will be described below in more detail with reference to FIG. 14.

Figure 13:
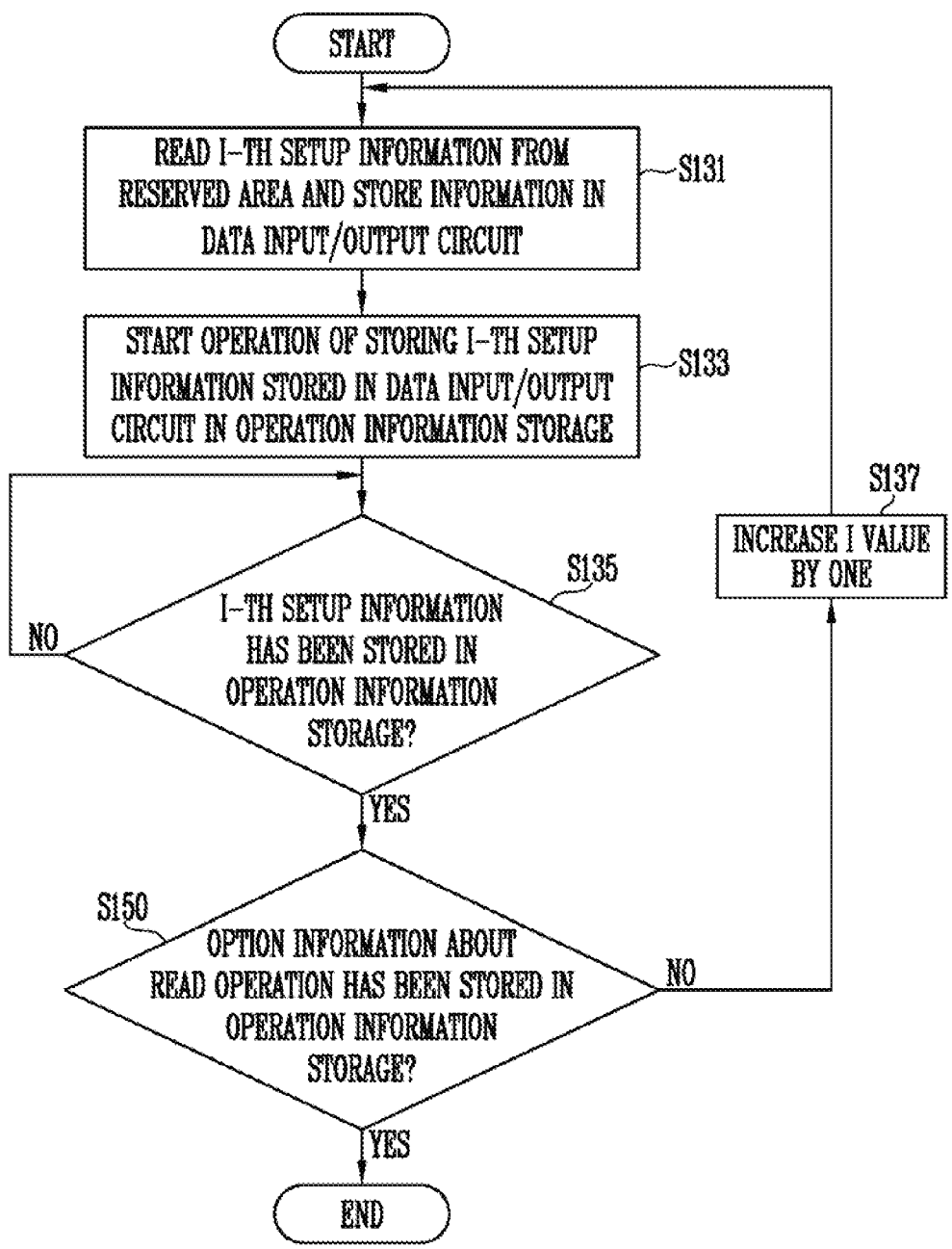
FIG. 13 is a flowchart illustrating an embodiment of operation S130 of FIG. 12.

FIG. 13 is a flowchart illustrating an embodiment of operation S130 of FIG. 12.

Referring to FIG. 13, operation S130 of FIG. 12 includes operation S131 of reading the i-th setup information from the reserved area and then storing it in the data input/output circuit, operation S133 of performing an operation of storing the i-th setup information stored in the data input/output circuit in the operation information storage, and operation S135 of determining whether the i-th setup information has been stored in the operation information storage. Meanwhile, operation S130 of FIG. 12 may further include operation 137 of increasing an i value by one, when the option information about the read operation has not been stored in the operation information storage.

Initially, the i value may be determined to be one. Thus, at operation S131, as in the period from t10 to t11 of FIG. 11, the read and write circuit 130 may perform the operation of reading the first setup information PRM1 and storing it in the data input/output circuit 160.

At operation S133, as in the period from t11 to t12 of FIG. 11, the first setup information PRM1 stored in the data input/output circuit 160 may be stored in the operation information storage 170.

Subsequently, at operation S135, it is determined whether the i-th setup information, namely, the first setup information PRM1 has been stored in the operation information storage 170. Before the first setup information PRM1 is stored, the process does not proceed to operation S150.

Thereafter, at operation S150, it is determined whether the option information about the read operation has been stored in the operation information storage (S150). FIG. 11 illustrates the example in which the option information about the read operation is included in the first setup information PRM1. Since the first setup information PRM1 is stored in the operation information storage 170, operation S130 is terminated.

As another example, if the option information about the read operation is included in the third setup information PRM3, the process will proceed to operation S137 as a result of determination in operation S150 when only the first setup information PRM1 is stored in the operation information storage S137. At operation S137, the i value is increased by one and then the process proceeds to operation S131. Thus, in the subsequent operation S131, the second setup information PRM2 will be read. Such an operation will be repeated until the third setup information PRM3 is stored in the operation information storage 170.

As illustrated in FIG. 13, in the case of using the first read method, the read operation for the next setup information is started after the setup information has been stored in the operation information storage 170. As a result, the initialization operation of the semiconductor memory device 100 may be stably carried out.

Figure 14:
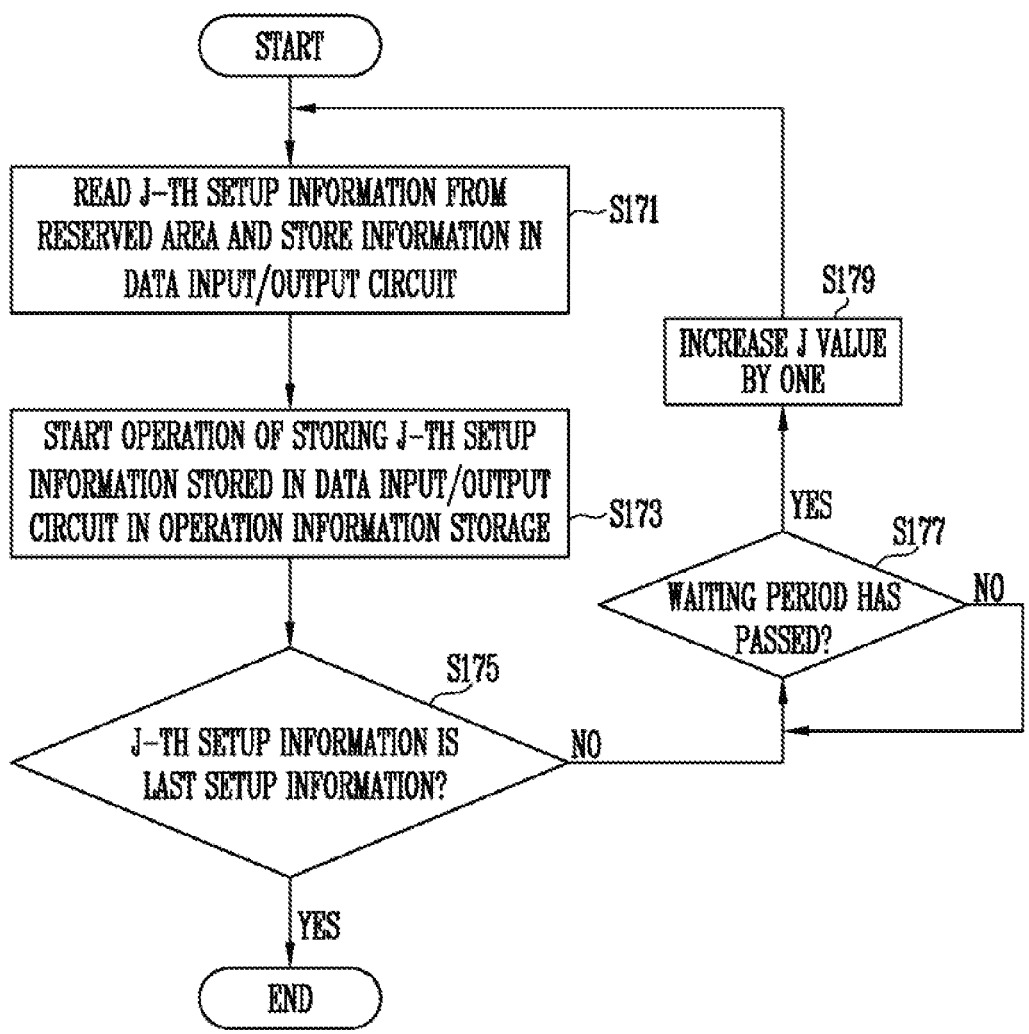
FIG. 14 is a flowchart illustrating an embodiment of operation S150 of FIG. 12.

FIG. 14 is a flowchart illustrating an embodiment of operation S170 of FIG. 12.

Referring to FIG. 14, operation S170 of FIG. 12 includes operation S171 of reading the j-th setup information from the reserved area and then storing it in the data input/output circuit, operation S173 of performing an operation of storing the j-th setup information stored in the data input/output circuit in the operation information storage, and operation S175 of determining whether the j-th setup information is the last setup information. Meanwhile, operation S170 of FIG. 12 may further include operation S177 of determining whether a predetermined waiting period has passed when the j-th setup information is not the last setup information, and operation S179 of increasing the j value by one when the waiting period has passed.

At an initial time, the j value may be set to a value that is larger by one than the last i value that has been previously considered according to the first read method. That is, when even the first setup information is stored in the operation information storage 170 by the first read method, the j value may be set to the value of 2. Thus, at operation S171, as in the period from t12 to t13 of FIG. 11, the read and write circuit 130 may perform the operation of reading the second setup information PRM2 and storing it in the data input/output circuit 160.

At operation S173, as in time t13 of FIG. 11, the second setup information PRM2 stored in the data input/output circuit 160 may be stored in the operation information storage 170.

In the subsequent operation S175, it is determined whether the j-th setup information is the last setup information. When it is determined at operation S175 that the j-th setup information is the last setup information, operation S170 of FIG. 12 will be terminated. Since the second setup information PRM2 is not the last setup information, the process proceeds to operation S177.

At operation S177, it is determined whether the predetermined waiting period t0 has passed. To be more specific, at operation S177, it is determined whether the waiting period t0 has passed from time t13 when the operation of reading the second setup information PRM2 has been completed. If the waiting period t0 has not passed (S177: No), the determination of operation S177 can be periodically continued until the waiting period t0 is passed.

If the waiting period has passed (S177: Yes), the j value is increased by one (j=3) and the process proceeds to operation S171. Thus, the third setup information will start to be read.

As illustrated in FIG. 14, in the case of using the second read method, the operation of storing specific setup information stored in the data input/output circuit in the operation information storage 170 is started at operation S173. If the predetermined waiting period t0 has passed (S177: Yes), the operation of reading the next setup information is started regardless of whether the setup information has been stored in the operation information storage 170. As a result, the initialization operation of the semiconductor memory device 100 may be rapidly carried out.

Figure 15:
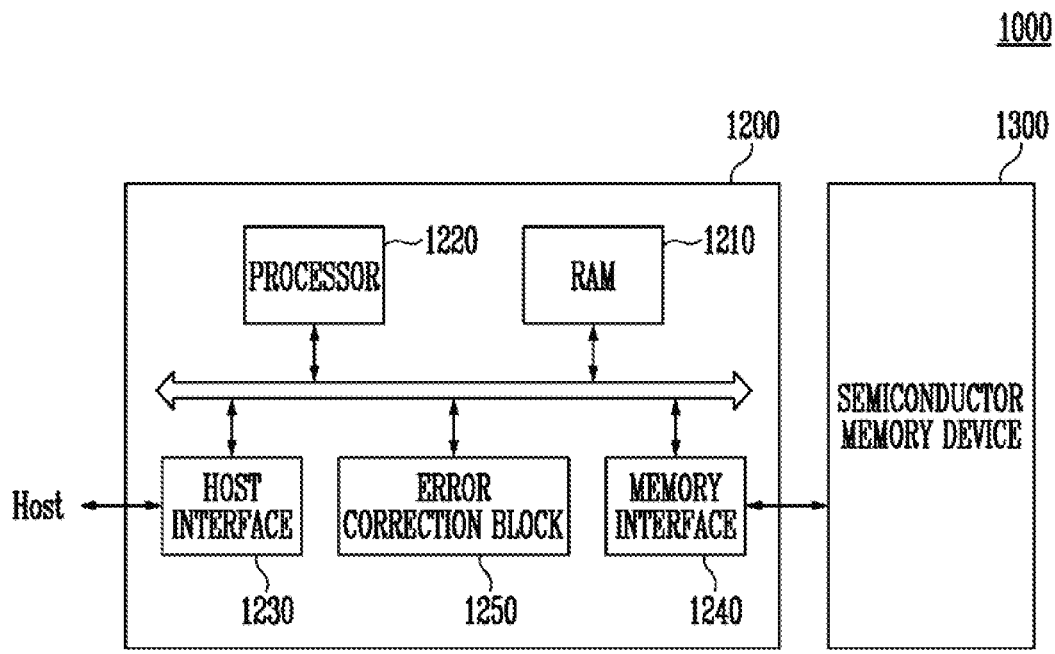
FIG. 15 is a block diagram illustrating a storage device including the semiconductor memory device of FIG. 2.

FIG. 15 is a block diagram illustrating an embodiment of a storage device including the semiconductor memory device of FIG. 2.

Referring FIG. 15, the storage device 1000 includes a semiconductor memory device 1300 and a controller 1200.

The semiconductor memory device 1300 may have the same configuration and operation as those of the semiconductor memory device described with reference to FIG. 2. Hereinafter, repetitive explanations are omitted.

The controller 1200 is coupled to a host Host and the semiconductor memory device 1300. The controller 1200 may access the semiconductor memory device 100 in response to a request from the host Host. For example, the controller 1200 may control read, program, erase, and background operations of the semiconductor memory device 1300. The controller 1200 may provide an interface between the semiconductor memory device 1300 and the host Host. The controller 1200 may drive firmware for controlling the semiconductor memory device 1300.

The controller 1200 includes a random access memory (RAM) 1210, a processing 1220, a host interface 1230, a memory interface 1240, and an error correction block 1250.

The RAM 1210 is used as at least one of an operating memory for the processor 1220, cache memory between the semiconductor memory device 1300 and the host Host, and buffer memory between the semiconductor memory device 1300 and the host Host.

The processor 1220 controls general operations of the controller 1200. The processor 1220 is configured to control read, program, erase, and background operations of the semiconductor memory device 1300. The processor 1220 drives firmware for controlling the semiconductor memory device 1300. The processor 1220 may perform the function of a flash translation layer (FTL). The processor 1220 may translate a logical block address (LBA), provided by the host, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The host interface 1230 may include a protocol for performing data exchange between the host Host and the controller 1200. In an embodiment, the controller 1200 may communicate with the host Host through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, and a private protocol.

The memory interface 1240 may interface with the semiconductor memory device 1300. For example, the memory interface 1240 includes a NAND interface or a NOR interface.

The error correction block 1250 may use an error correcting code (ECC) to detect and correct an error in data received from the semiconductor memory device 1300. The error correction block 1250 may correct errors from read page data using an ECC. The error correction block 1250 may correct errors using a low density parity check (LDPC) code, a Bose, Chaudhri, Hocquenghem (BCH) Code, a turbo code, a Reed-Solomon code, a convolution code, a recursive systematic code (RSC), or coded modulation such as trellis-coded modulation (TCM), block coded modulation (BCM), or hamming code.

The controller 1200 and the semiconductor memory device 1300 may be integrated into a single semiconductor device. In an embodiment, the controller 1200 and the semiconductor memory device 1300 may be integrated into a single semiconductor device to form a memory card. For example, the controller 1200 and the semiconductor memory device 1300 may be integrated into a single semiconductor device and form a memory card such as a personal computer memory card international association (PCM-CIA), a compact flash card (CF), a smart media card (SMC), a memory stick multimedia card (MMC, RS-MMC, or MMCmicro), a SD card (SD, miniSD, microSD, or SDHC), or a universal flash storage (UFS).

The controller 1200 and the semiconductor memory device 1300 may be integrated into a single semiconductor device to form a solid state drive (SSD). The SSD includes a storage device 1000 configured to store data in the semiconductor memory device 1300. When the storage device 1000 is used as the SSD, the operating speed of the host Host coupled to the storage device 1000 is phenomenally improved.

In another embodiment, the storage device 1000 may be provided as one of various elements of an electronic device such as a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), a game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in an wireless environment, one of various devices for forming a home network, one of various electronic devices for forming a computer network, one of various electronic devices for forming a telematics network, an RFID device, one of various elements for forming a computing system, or the like.

In an embodiment, the semiconductor memory device 1300 or the storage device 1000 may be embedded in various types of packages. For example, the semiconductor memory device 1300 or the storage device 1000 may be packaged in a type such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline integrated circuit (SOIC), Shrink Small Outline Package (SSOP), Thin Small Outline Package (TSOP), Thin Quad Flatpack (TQFP), System In Package (SIP), Multi-Chip Package (MCP), Wafer-level Fabricated Package (WFP), Wafer-Level Processed Stack Package (WSP), or the like.

Figure 16:
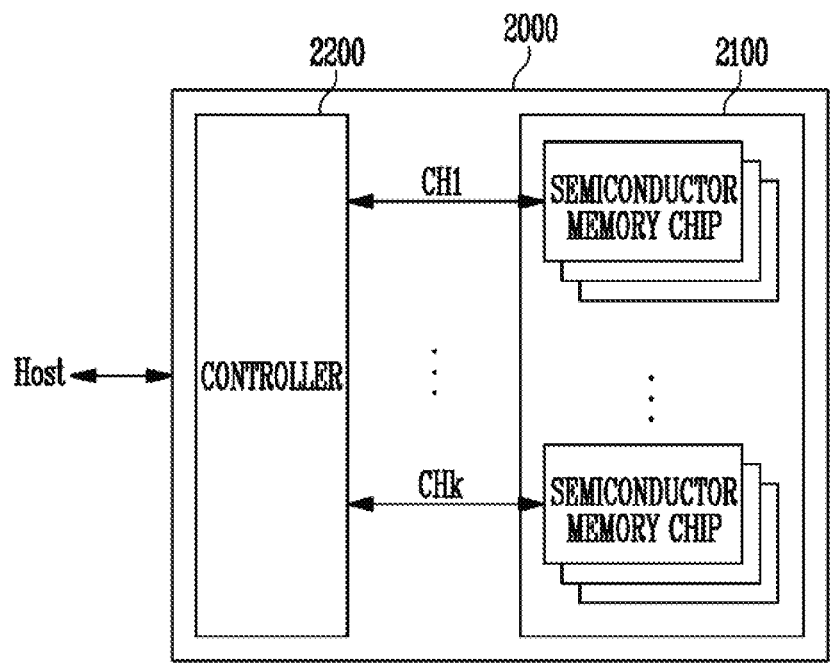
FIG. 16 is a block diagram illustrating an application example of the storage device of FIG. 15.

FIG. 16 is a block diagram illustrating an application example of a storage device 2000 of FIG. 15.

Referring FIG. 16, the storage device 2000 includes a semiconductor memory device 2100 and a controller 2200. The semiconductor memory device 2100 includes a plurality of semiconductor memory chips. The semiconductor memory chips are divided into a plurality of groups.

In FIG. 16, it is illustrated that the plurality of groups respectively communicate with the controller 2200 through first to k-th channels CH1 to CHk. Each semiconductor memory chip may have the same configuration and operation as those of an embodiment of the semiconductor memory device 100 described with reference to FIG. 2.

Each group may communicate with the controller 2200 through one common channel. The controller 2200 has the same configuration as that of the controller 1200 described with reference to FIG. 15 and is configured to control a plurality of memory chips of the semiconductor memory device 2100 through the plurality of channels CH1 to CHk.

In FIG. 16, a plurality of semiconductor memory chips has been illustrated as being coupled to each channel. However, it will be understood that the storage device 2000 may be modified into a configuration such that a single memory chip is coupled to each channel.

Figure 17:
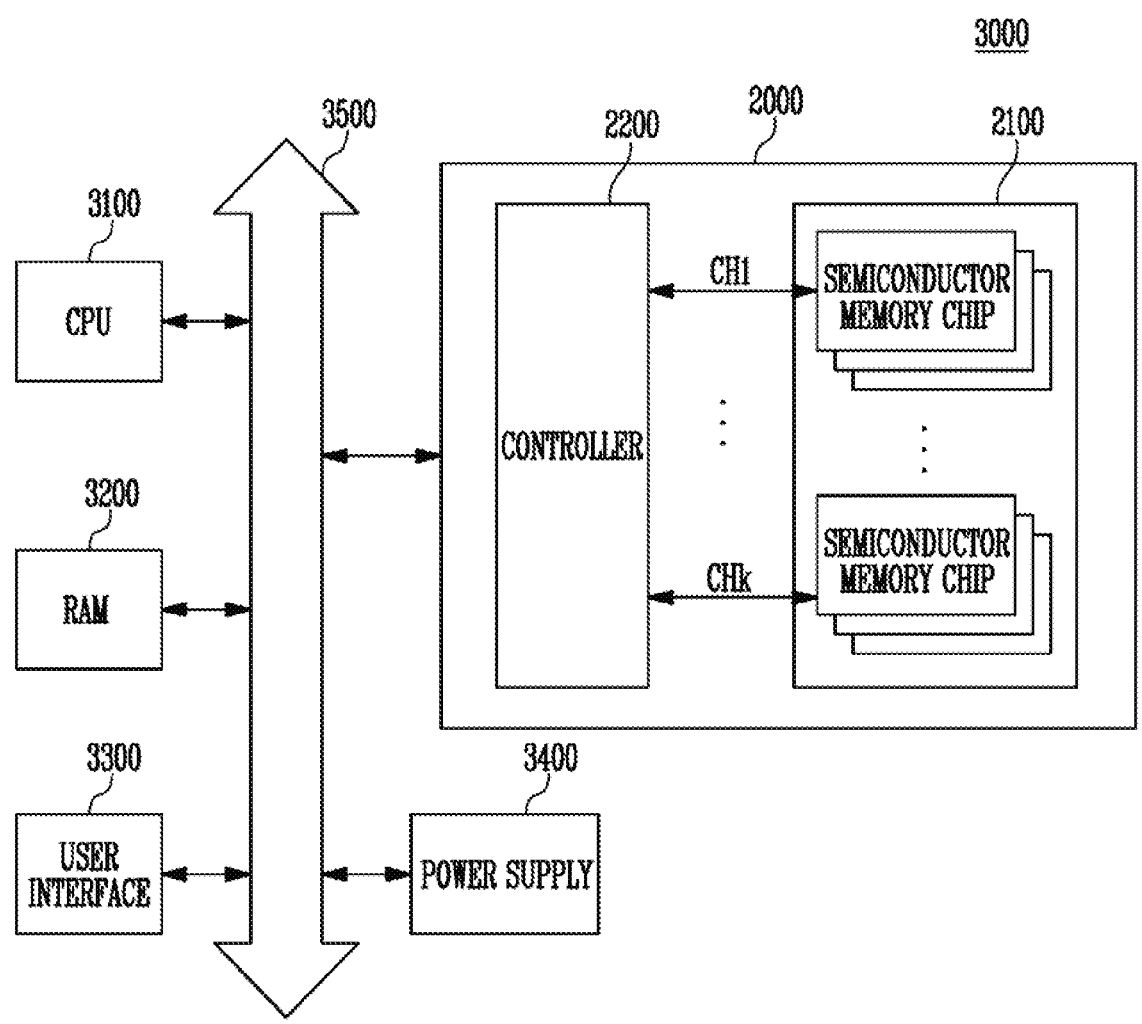
FIG. 17 is a block diagram illustrating a computing system including a storage device described with reference to FIG. 16.

FIG. 17 is a block diagram illustrating a computing system including the storage device 2000 described with reference to FIG. 16.

Referring to FIG. 17, the computing system 3000 includes a central processing unit 3100, a RAM 3200, a user interface 3300, a power supply 3400, a system bus 3500, and the storage device 2000.

The storage device 2000 is electrically coupled to the CPU 3100, the RAM 3200, the user interface 3300, and the power supply 3400 through the system bus 3500. Data provided through the user interface 3300 or processed by the CPU 3100 may be stored in the storage device 2000.

In FIG. 17, the semiconductor memory device 2100 is illustrated as being coupled to the system bus 3500 through the controller 2200. However, the semiconductor memory device 2100 may be directly coupled to the system bus 3500. The function of the controller 2200 may be performed by the CPU 3100 and the RAM 3200.

In FIG. 17, the storage device 2000 described with reference to FIG. 16 may be provided. However, the storage device 2000 may be replaced with the storage device 1000 described with reference to FIG. 15. In an embodiment, the computing system 3000 may include both the storage devices 1000 and 2000 described with reference to FIGS. 15 and 16.

As described above, the present disclosure provides a semiconductor memory device having an improved operating speed.

The present disclosure provides a method of operating a semiconductor memory device having an improved operating speed.

While embodiments of the present disclosure have been presented for illustrative purposes, those skilled in the art will appreciate that various modifications, additions and substitutions are possible. Therefore, the scope of the present disclosure should be defined by the appended claims and equivalents of the claims rather than by the description preceding them.

Although embodiments of the present disclosure have been presented, those skilled in the art will appreciate that various modifications, additions and substitutions are possible, without departing from the scope and spirit of the present disclosure.

Therefore, the scope of the present disclosure should be defined by the appended claims and equivalents of the claims rather than by the description preceding them.

In the above-discussed embodiments, all operations may be selectively performed or skipped. In addition, the operations in each embodiment might not be always performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A semiconductor memory device, comprising:
a memory cell array including a plurality of memory cells;
a peripheral circuit configured to perform a read operation for setup information stored in the memory cell array;
an operation information storage configured to store the setup information read from the memory cell array; and
a control logic configured to control the read operation performed by the peripheral circuit and a storage operation of the operation information storage,
wherein the control logic controls the peripheral circuit and the operation information storage such that a storage time period in which the operation information storage stores first setup information and a read time period in which the peripheral circuit reads second setup information from the memory cell array are at least partially overlapped with each other.

2. The semiconductor memory device according to claim 1,
wherein the memory cell array comprises a user area and a reserved area, and
wherein the setup information is stored in the reserved area.

3. The semiconductor memory device according to claim 1, wherein the setup information is stored in the operation information storage during an initialization operation.

4. The semiconductor memory device according to claim 1, wherein the plurality of memory cells comprises nonvolatile memory cells, and the operation information storage comprises a volatile memory.

5. The semiconductor memory device according to claim 1, wherein the control logic controls the operation information storage and the peripheral circuit such that the peripheral circuit starts the read operation for reading the second setup information after a predetermined waiting period has passed from a time when the operation information storage starts storing the first setup information.

6. The semiconductor memory device according to claim 1, wherein, after option information about the read operation among the setup information is stored in the operation information storage, the storage operation and the read operation are performed such that the storage time period for storing the first setup information and the read time period for reading the second setup information are at least partially overlapped with each other.

7. A semiconductor memory device, comprising:
a memory cell array including a plurality of memory cells;
a peripheral circuit configured to perform a read operation for setup information stored in the memory cell array;
an operation information storage configured to store the setup information read from the memory cell array; and
a control logic configured to control the read operation performed by the peripheral circuit and the storage operation of the operation information storage,
wherein the control logic controls the peripheral circuit and the operation information storage such that a storage time period in which the operation information storage stores first setup information and a read time period in which the peripheral circuit reads second setup information from the memory cell array are optionally overlapped with each other, based on whether option information about the read operation is stored in the operation information storage.

8. The semiconductor memory device according to claim 7, wherein the control logic controls operations of the operation information storage and the peripheral circuit such that the storage time period in which the operation information storage stores the first setup information and the read time period in which the peripheral circuit reads the second setup information from the memory cell array are not overlapped with each other when the option information about the read operation is not stored in the operation information storage.

9. The semiconductor memory device according to claim 8, wherein the control logic controls the peripheral circuit to start the read operation of the second setup information after the first setup information is stored in the operation information storage.

10. The semiconductor memory device according to claim 7, wherein the control logic controls operations of the operation information storage and the peripheral circuit such that the storage time period in which the operation information storage stores the first setup information and the read time period in which the peripheral circuit reads the second setup information from the memory cell array are overlapped with each other when the option information about the read operation is stored in the operation information storage.

11. The semiconductor memory device according to claim 10, wherein the control logic controls the peripheral circuit to start the read operation of the second setup information after a predetermined waiting period has passed from a time when the first setup information starts to be stored in the operation information storage.

12. The semiconductor memory device according to claim 7, wherein the peripheral circuit comprises:
a read and write circuit configured to read data stored in the memory cell array; and
a data output circuit configured to temporarily store the data read from the memory cell array.

13. A method of operating a semiconductor memory device including a memory cell array, a data input/output circuit, and an operation information storage, the method comprising:
a first storage operation of reading setup information stored in a reserved area of the memory cell array and then storing the setup information in the operation information storage, by a first read method where a data storage time period for storing data, read from the memory cell array, in the operation information storage is separated from a data read time period reading subsequent data from the memory cell array;
determining whether option information about a read operation is stored in the operation information storage; and
a second storage operation of reading the setup information stored in the reserved area of the memory cell array and then storing the information in the operation information storage, by the first read method or a second read method where the data storage time period and the data read time period are at least partially overlapped with each other, based on the determined result.

14. The method of operating the semiconductor memory device according to claim 13, wherein the first storage operation comprises:
reading first setup information from the memory cell array;
storing the first setup information in the operation information storage; and reading second setup information from the memory cell array after the first setup information is stored in the operation information storage.

15. The method of operating the semiconductor memory device according to claim 13, wherein, when it is determined that the option information about the read operation is not stored in the operation information storage, the second storage operation comprises:

reading third setup information from the memory cell array;

storing the third setup information in the operation information storage; and reading fourth setup information from the memory cell array, after the third setup information is stored in the operation information storage.

16. The method of operating the semiconductor memory device according to claim 13, wherein, when it is determined that the option information about the read operation is stored in the operation information storage, the second storage operation comprises:

reading third setup information from the memory cell array;

starting an operation of storing the third setup information in the operation information storage; and determining whether a predetermined waiting period has passed; and starting an operation of reading fourth setup information from the memory cell array when the waiting period has passed.

* * * * *